Dec. 24, 1935. B. M. SHIPLEY Re. 19,793

CASH REGISTER

Original Filed April 25, 1927 3 Sheets-Sheet 1

Inventor
Bernis M. Shipley

By Carl Beust

His Attorney

Dec. 24, 1935. B. M. SHIPLEY Re. 19,793

CASH REGISTER

Original Filed April 25, 1927 3 Sheets-Sheet 2

Inventor
Bernis M. Shipley
By
Earl Benoit
His Attorney

Dec. 24, 1935. B. M. SHIPLEY Re. 19,793

CASH REGISTER

Original Filed April 25, 1927 3 Sheets-Sheet 3

Inventor
Bernis M. Shipley

By

Earl Benedt

His Attorney

Reissued Dec. 24, 1935 Re. 19,793

UNITED STATES PATENT OFFICE 19,793

CASH REGISTER

Bernis M. Shipley, Dayton, Ohio, assignor to The National Cash Register Company, Dayton, Ohio, a corporation of Maryland Original No. 1,730,095, dated October 1, 1929, Serial No. 186,323, April 25, 1927. Application for reissue December 24, 1934, Serial No. 759,119

14 Claims. (Cl. 235—7)

This invention relates to improvements in adding and subtracting totalizers; and for the purpose of illustration is shown attached to a machine of the type shown and described in Letters Patent of the United States issued to F. L. Fuller, No. 1,242,170 on October 9, 1917.

One object of this invention is to provide an adding and subtracting totalizer in which the negative balance will always be the true balance, and which is obtained without adding the so-called "fugitive 1" into the units wheel, when the totalizer is overdrawn.

Another object of the invention is to provide an adding and subtracting totalizer in which the sum of the amounts standing on the negative and positive sides of the totalizer always equal zero.

Another object is to provide an adding and subtracting totalizer in which both wheels stand at zero when the totalizer has been cleared.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

*General description*

Figure 1:
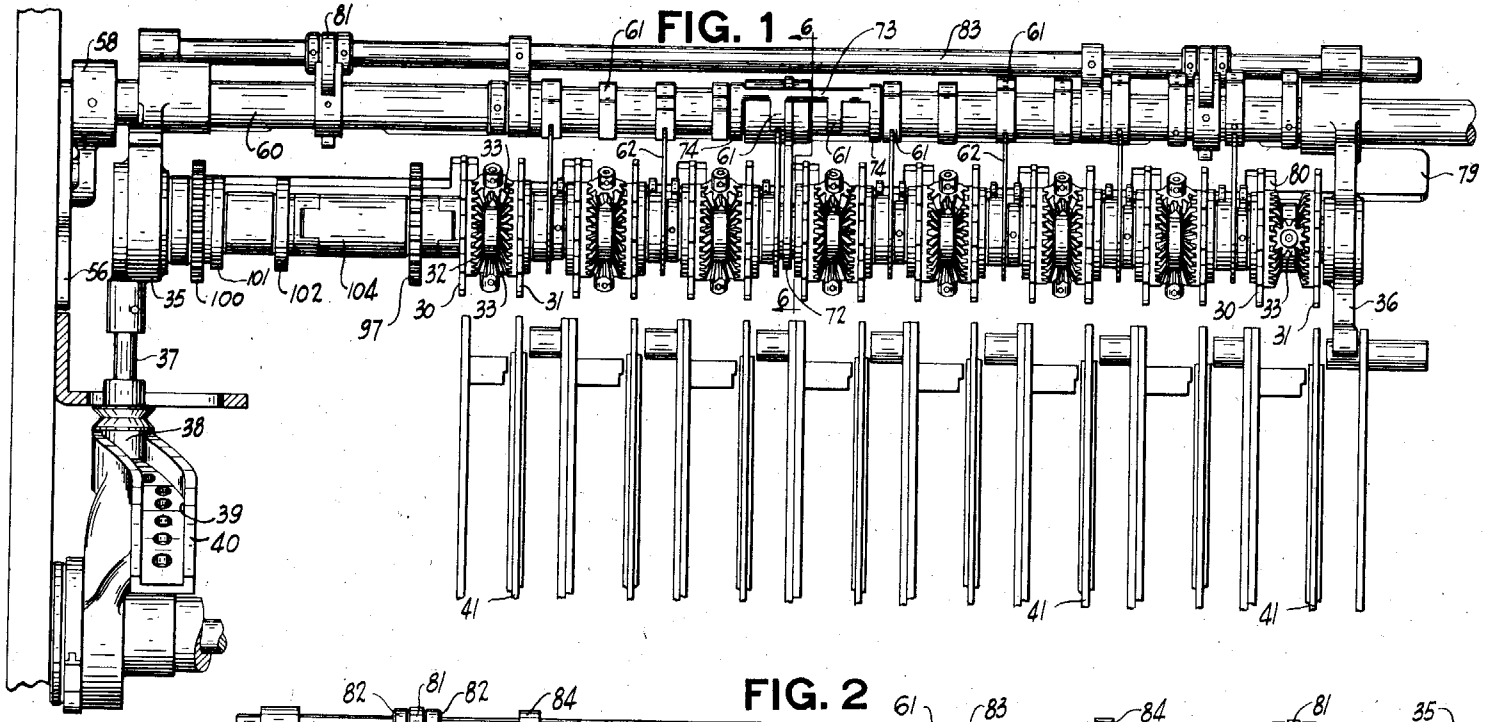
Fig. 1 is the front elevation of the adding and subtracting totalizer, showing its relation with the actuators and its shifting mechanism.

This invention is an improvement in that type of adding and subtracting totalizer, in which the negative side of the totalizer has thereon the complement of the amount which is on the positive side of the totalizer. In that type of totalizer many ways have been devised for adding one (known in the art as the "fugitive 1") into the units wheel when an overdraft is made. The usual method is to trip a special device in the units bank, which device is controlled from the highest order totalizer element, or by a special key. In the present totalizer the negative balance is always the true balance, the totalizer being adapted to correct itself automatically for any condition.

In order to illustrate the theory of operation and to point out the difference between the method of operation of the totalizer disclosed herein, and the method of operation of the usual adding and subtracting totalizer, the four examples below have been assumed, and each example is separately identified with headings A, B, C and D. In each example, the usual method is shown on the right, while the present improved method is shown on the left.

*Example A*

00,000.00—plus side—00,000.00
00,000.00—neg. side—99,999.99

*Example B*

00,000.01—plus side—00,000.01
99,999.99—neg. side—99,999.98

*Example C*

00,001.00—plus side—00,001.00
99,999.00—neg. side—99,998.99

*Example D*

99,998.00—plus side—99,998.00
00,002.00—neg. side—00,001.99

In Example A the totalizer in each case is shown with the plus side standing at zero. In the left hand column, which shows the way the improved totalizer stands, the negative side of the totalizer is also shown to be standing at zero, while in the right hand column the negative side of the old form of totalizer is shown and it has standing thereon the complement of "nine" of the number standing on the plus side, namely, 99,999.99.

When the positive side of the totalizer is being engaged with the actuators, all of the negative wheels, except the units wheel, will automatically be changed to 9's, with the result that by the time this engagement is completed, the negative side of the totalizer will be standing with 99,999.90 thereon. If nothing is added to the totalizer the disengaging movement of the totalizer will again return all of the negative wheels to zero.

Example B, left column, shows the amount standing on both sides of the present totalizer after one cent has been added. When any amount is standing on the units wheel, none of the higher order wheels of the negative side will be changed back to zero when the totalizer is again disengaged. Therefore, when the totalizer is disengaged from the actuators with one cent standing on the plus side, the negative side will have 99,999.99 thereon. This is the true negative value. The right column shows how the usual add and subtract totalizer would be standing. This shows that the negative side is one unit short of the true negative value.

Example C shows the totalizer with $1.00 added on the positive side. It will be noticed that the negative units and tens wheels are both standing at zero, and the hundreds wheel and all higher wheels are standing at 9. This is automatically determined by the totalizer while it is being disengaged from the actuator. When the totalizer stands at zero and the positive side thereof is being engaged, the negative wheels are all turned to 9 except the units wheel. Then when an amount is added to any order wheel a control is set which causes the corresponding negative wheel and all lower order wheels, except the units wheel to be turned forward one step during the disengaging movement. However, all orders above, are prevented from moving forward this one step. When a number is added to more than one order, only the lowest order in which an amount is added, and all lower orders except the units are given the forward step. In this manner the true negative value is always standing on the negative wheels. The right hand column shows how the negative wheels would be standing on the usual add and subtract totalizer, which as in Examples A and B, is one cent short of the true negative balance.

Example D shows the position of the totalizer after an overdraft of $2.00 has been made. During the subtracting operation the negative wheels are engaged with the actuators and while the totalizer is being engaged with the actuators, all the positive wheels lower than the wheel upon which an amount is standing except the units wheel will be turned to 9 and if nothing is standing on the totalizer, all wheels except the units wheel will be turned to 9 just as the negative wheels are turned to 9 when the positive wheels are engaged with the actuators.

Suppose $1.00 is standing on the plus side of the totalizer and $3.00 is to be subtracted therefrom. When the negative side of a totalizer has been engaged the positive side will stand with 00,000.90 thereon, and the negative side with 99,999.00 thereon. During the operation of the machine the hundreds negative wheel will have 3 added thereto, thereby moving it to 2 and transferring 1 across the balance of the totalizer and leaving the negative wheels 31 at 00,002.00. This is the true negative balance, as illustrated in the left hand column, Example D. The positive wheels 30 now stand at 99,997.90. The totalizer is now disengaged from the actuators, and during this movement the tens positive wheel 30 is moved from "9" to "0", and the hundreds wheel from "7" to "8" thus leaving the positive wheels at 99,998.00, the true complement of the negative wheels. The right hand column in this example shows the condition of the usual totalizer at the end of an overdraft operation and illustrates the necessity of adding 1 every time an overdraft is made, before the correct totals can be printed. In the present totalizer, this adding of the extra 1 in the units bank is unnecessary.

*Detailed description*

Figure 3:
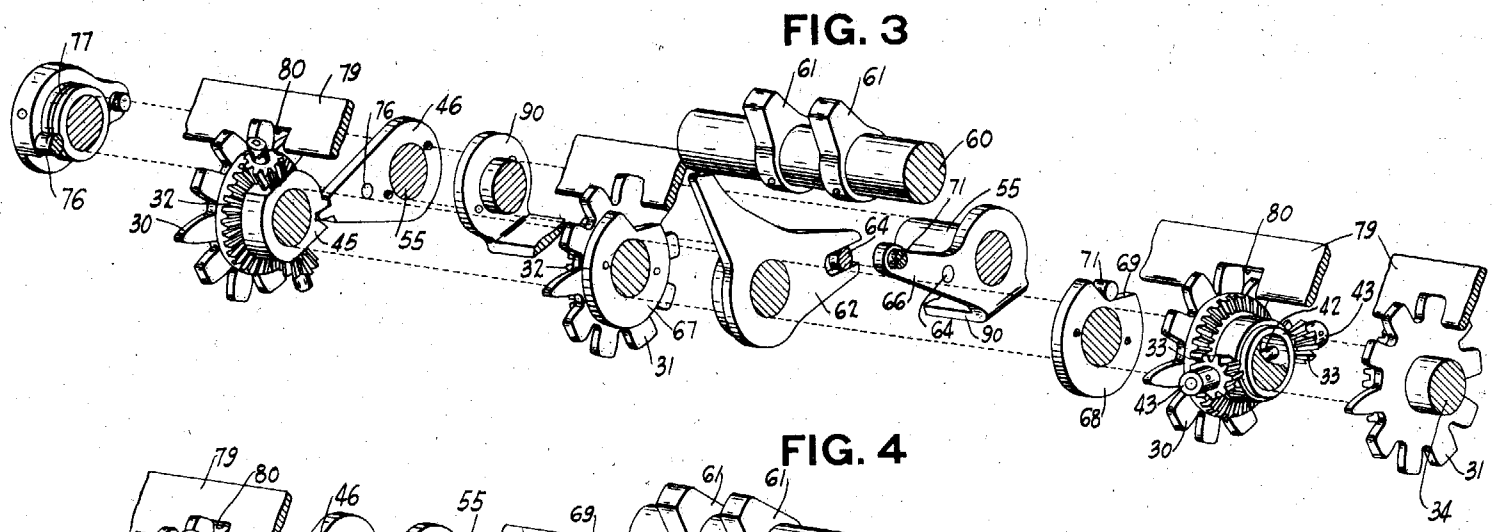
Fig. 3 is a perspective view of the units and tens totalizer elements, with the parts shown disassembled.
Figure 4:
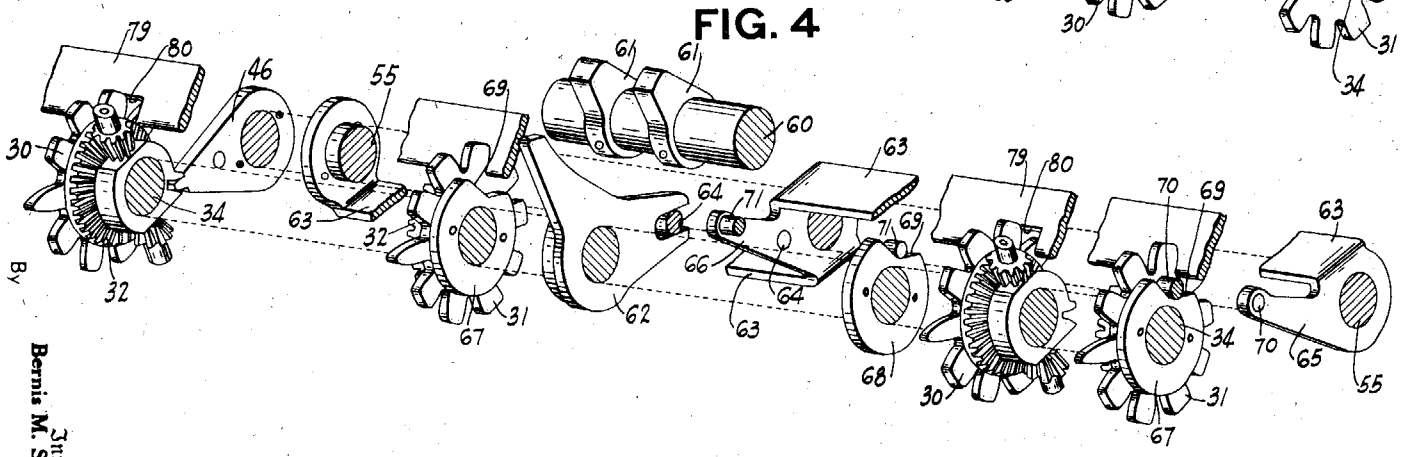
Fig. 4 is a perspective view of the tens and hundreds totalizer elements, shown with the parts disassembled.
Figure 9:
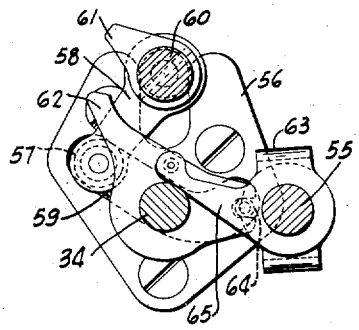
Fig. 9 is a detail view of the mechanism for causing the totalizer to be engaged with its actuators.
Figure 8:
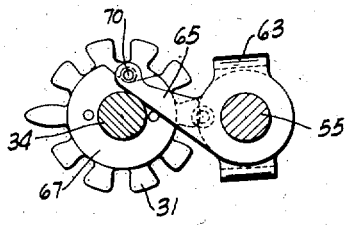
Fig. 8 is a detail view of one of the cams for operating the control yoke of the totalizer.

Each totalizer order consists of a positive wheel 30 and a negative wheel 31, Figs. 1, 3 and 4. Each totalizer wheel has secured thereto a beveled gear 32 which meshes with beveled pinions 33 for causing the wheels to move in opposite directions. The totalizer wheels are mounted to rotate freely upon a shaft 34, Figs. 3, 4 and 9, which is carried by frames 35 and 36. The frame 35 has a rod 37 on the end of which is mounted an anti-friction roller 38 projecting into a cam groove 39, in a differentially adjustable cam 40. The cam 40 is adjusted under control of a bank of keys not shown herein, for laterally shifting the totalizer to shift the positive wheels 30 or the negative wheels 31 into alignment with the actuators 41. Fig. 1 shows the negative wheels 31 in alignment with the actuators. The actuators 41 are not shown in elevation herein, inasmuch as they are of an old and well-known construction and a detailed description thereof, together with the mechanism for adjusting the cam 40, may be had by referring to the above mentioned Fuller patent. The pinions 33 for the units wheels 30 and 31 (Fig. 3) are carried on a rod 42, (Fig. 3) which projects through the shaft 34 and is provided with collars 43 for holding the pinions in position. The pinions 33 for each of the higher orders are mounted on bearings 44 (Figs. 10 and 11) formed on collars 45, loosely mounted on the shaft 34. The collars 45 are provided with notches each of which is engaged by a single toothed arm 46, which will be hereinafter described. This construction is provided so that the collars 45 together with the pinions 33, mounted thereon, may be rotated on the shaft 34. The pinions 33 for the higher order wheels are also held in position on their bearings 44 by collars 43 in the same manner as the units order pinions 33 are held on the rod 42.

Before an amount has been added on the totalizer, both sets of totalizer wheels, that is, the positive and negative wheels 30 and 31, stand at zero. However, during the engaging movement of the totalizer with the actuators 41, the set of wheels which is not engaged with the actuators is moved backwardly to 9. This is true of all orders except the units. Both the positive and negative units wheels remain at zero during this engaging movement.

Figure 7:
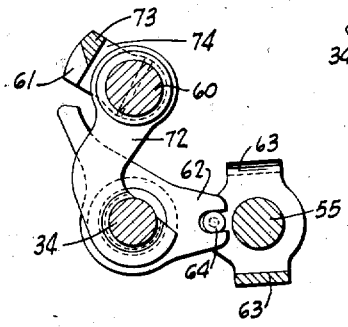
Fig. 7 is a detail view of a part of the totalizer showing a part of one of the control yokes, the operating lever, and the special construction of certain of the operating cams for this lever; and also the supporting brace for the totalizer shaft.

The engaging movement of the totalizer is accomplished by a pair of cam plates 56 (Figs. 1 and 9), one of which is mounted at each end of the totalizer and which are securely fastened to the frames of the machine. A roller 57 (Fig. 9), mounted on an arm 58 cooperates with a cam slot 59 in each of the plates 56. A shaft 60, to which the arms 58 are secured, is rocked by the regular totalizer engaging spider (not shown), but shown and described in the above mentioned Fuller Patent No. 1,242,170. Upon rotating the shaft 60, the rollers 57 cooperating with the cam slots 59 cause the shaft 60 to be lowered. The shaft 60 is carried by the beforementioned totalizer frames 35 and 36, (Fig. 1) and therefore this movement will cause the totalizer to be rocked into engagement with the actuators 41. This rocking movement of the shaft 60 is utilized in causing the totalizer wheels to be moved back one step to 9's, as above mentioned. A bracket 72 (Figs. 1 and 7) slidably mounted on the shaft 60 embraces the shaft 34 and acts as a brace for the latter to maintain its parallelism with the shaft 60. Secured to the shaft 60 is a series of cams 61, (Figs. 1 to 4 and 9) which are spirally arranged on the shaft, in such a manner so as to cause the cams 61 for the highest order to become effective first and then the next lower order and so on, to the tens order during the engaging movement.

In order to make room for the bracket 72 to slide upon the shaft 60, it is necessary that certain of the cams 61 be specially constructed. As seen in Fig. 1, the fifth and sixth cams from the left are the ones to which this applies. The fourth and seventh cams 61 from the left (Fig. 1) are connected to arm 74 of a yoke 73. The fifth and sixth cams from the left (Fig. 1) are formed by projections from the yoke 73. These two cams are not mounted individually on the shaft 60 as are the other cams.

By reason of the particular construction of these two cams, yoke 73 and arms 74, the bracket 72 is permitted to slide longitudinally on the shaft 60 as the totalizer is shifted from its positive to its negative side and vice versa. These two cams (fifth and sixth from the left end, and as viewed in Fig. 1) are so arranged as to constitute a part of the spiral formation above mentioned, so that they act in timed relation relative to the single cams 61 secured to the shaft 60.

Figure 10:
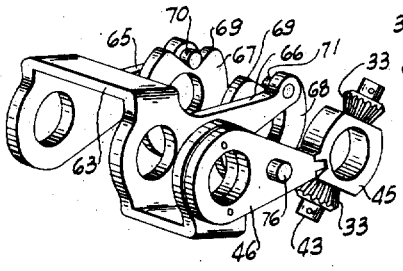
Fig. 10 is a detail perspective view of the yoke mechanism for one of the higher order elements.
Figure 11:
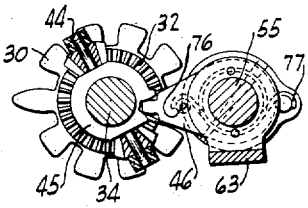
Fig. 11 is a detail view of the arms for causing one of the totalizer elements to be rotated one step while the totalizer is being engaged with the actuator.

Freely mounted on the shaft 34, for each order except the units order, is a lever 62 adapted to be engaged by a cam 61 to operate yokes 63 (Figs. 4 and 10) pivoted on a rod 55. Each lever 62 is operatively connected to a yoke 63 by the pin in slot connection 64 (Fig. 4). The yoke 63 has secured thereto one of the single toothed arms 46, as shown in Fig. 10. Each yoke 63 has also formed thereon two arms 65 and 66, carrying studs 70 and 71 cooperating with cams 67 and 68, one for each wheel of each totalizer order, these cams being secured to the negative wheel 31 and positive wheel 30 respectively. When the positive and negative wheels are both standing at zero, the studs 70 and 71 on the arms 65 and 66 both are in position to engage notches 69 of the cams 67 and 68 respectively. However, if either one wheel is moved one step or more out of zero position the yoke 63 will be held up in its operated position with the studs 70 and 71 slightly away from the peripheries of the cams 67 and 68.

Each single toothed arm 46 is provided with a stud 76, engaged by coil spring 77 (Fig. 11), which normally tends to rotate the arm 46 in a counter-clockwise direction (Fig. 11), thereby constantly tending to rotate the arms 65 and 66 clockwise (Fig. 10), counter-clockwise (Fig. 4) to engage their studs 70 and 71 with the cams 67 and 68. From this it can be seen that if one of the cams has been moved out of the zero position, the studs 70 and 71 on the arms 65 and 66 will be lowered into engagement with the peripheries of the cams 67 and 68, thereby preventing the yokes 63 from rocking back to normal.

When the totalizer is engaged by the rocking and sliding movement of the shaft 60, the cams 61 will engage the levers 62, thereby rocking the yokes 63 in a clockwise direction (Fig. 9) far enough to disengage the studs 70 and 71 on the arms 65 and 66 from the recesses 69 of the cams 67 and 68. This movement will rock the single toothed arms 46 far enough to cause the collar 45 for the next higher order wheels to be rotated far enough to move each of them one step back to 9. During this engaging movement, one set of the wheels either 30 or 31 is held against movement by an aliner 79, (Fig. 1). This aliner will be engaged with the wheels in alignment with the actuator 41, thereby preventing said wheels from rotating. However, the aliner 79 is provided with notches 80 (Figs. 2 and 3) for the totalizer wheels which are not to be engaged with the actuators 41, thereby permitting free rotation of these wheels. Since one set of the totalizer wheels is held against movement by the aliner 79, rotation of the collars 45 will cause the other totalizer wheels to be moved one step, due to the pinions 33 which are meshed with the gears 32 for both the positive and negative wheels.

As before mentioned, this backward movement of one set of the totalizer wheels only takes place in the orders higher than the units order. The units order will always remain with both totalizer wheels 30 and 31 at zero, after the engaging movement, because there is no connection, corresponding to the connections 45, 46 and 65, for the higher orders, in the units bank. After this engaging movement, any amount may be added on the various elements, whereupon the cams 67 and 68 will be adjusted according to the amounts added to the elements. Then when the totalizer is again disengaged from the actuators, the yokes 63 may either be turned back to normal position, if the cams 67 and 68 present both of their notches to the studs 70 and 71 on the arms 65 and 66, or the arms will be held up by the peripheries of the cams and prevent this return movement of these arms 65 and 66, thereby holding the yokes 63 in their moved positions.

The arms on the yoke 63 cooperate with the cams 67 and 68 on the totalizer wheels of a lower order than the order of the collar 45 which is operated by the single toothed arm 46. In this manner the lower order always controls the position of the collar 45 for the next higher order. For this reason, if an amount is standing on, for example, the units wheel, all of the yokes 63 will be held up in their raised or moved positions, regardless of whether an amount is standing on the higher order wheels or not, due to the fact that if the lower order yoke 63 is held up, it in turn will hold the collar 45 for the next higher order in its moved position, thereby holding the cam 67 in its moved position, and in this manner holding the yoke 63 for the next succeeding higher order in its moved position. In this manner all the yokes across the entire totalizer will be held up.

The yokes 63 and 90 are so arranged that the lowest order totalizer wheel, upon which an amount is standing, will control all of the yokes 63 associated with the higher order totalizer wheels, so that the latter yokes will be held in their moved positions upon the disengagement of the totalizer from the actuators.

By way of explanation, let it be assumed that the totalizer stands at zero and is disengaged from the actuators; the positive and negative wheels of the totalizer now read—

00,000.00+
(Totalizer disengaged)
00,000.00—

Let is now be assumed that $10.00 is to be added into the totalizer. Before this amount is added, the positive wheels 30 are moved into engagement with the totalizer actuators 41. After this engagement, and before any amount is added into the totalizer, the wheels stand at—

00,000.00+
(Totalizer engaged)
99,999.90—

The $10.00 is now added into the totalizer by the actuators 41. With the totalizer still engaged with the actuators the wheels now read—

00,010.00+ (Totalizer engaged—
$10.00 added to
99,989.90— positive wheels)

With the totalizer in this condition, all of the yokes 63, controlled by the tens-of-dollars wheel and those wheels of higher order, will be held in their moved positions, so that when the totalizer is disengaged from the actuator, those negative wheels above the tens-of-dollars wheel will not be moved during such disengagement of the totalizer. However, the negative wheels of lower orders, except the units wheel, will be given a return movement of one step upon the disengagement of the totalizer from the actuator, so that after the totalizer is disengaged, the positive and negative wheels will read as follows—

00,010.00+ (Totalizer disengaged
with $10.00 added
99,990.00— thereto)

During this disengaging movement of the totalizer the yokes 63 and 90 controlled by the wheels of lower order than the tens-of-dollars wheel are free to return to home positions because the cams 67 and 68 associated with those orders of wheels stand with their notches 69 to permit the studs 70 and 71 on the arms 65 and 66 to drop therein, thus permitting those yokes to return to their normal positions so that the tens-of-cents, and units-of-dollars negative wheels will return to zero, and the tens-of-dollars negative wheel will move from "8" to "9" as indicated above.

To further explain the operation of the mechanism of the invention, let it be assumed that the amount of $125.55 is to be subtracted from the total of $10.00, which is the result of the calculation explained above. As pointed out, when the totalizer is disengaged the positive and negative wheels stand as follows:

00,010.00+
(Totalizer disengaged)
99,990.00—

Before the amount of $125.55 can be subtracted, the negative wheels 31 are moved into engagement with the totalizer actuators 41. After this engagement, and before any amount is added into the totalizer, the wheels stand at 00,009.90+
(Totalizer engaged)
99,990.00—

During this engaging movement the cams 67 and 68 for the three lowest orders present notches to the yokes 63 and 90 so that the tens, hundreds, and thousands order wheels 30 (positive wheels) are moved backwardly one step as shown, but since the thousands denomination was standing with "1" thereon, the cams 67 and 68 prevent all higher order denominations from being moved backwardly by the yokes 63, these wheels having been displaced during the preceding operation and having been held displaced. The units wheel is never rotated backwardly as above explained. The $125.55 is now entered into the subtract wheels by adding this amount to the amount on the subtract wheels 31. Thereafter, with the wheels 31 still engaged with the actuators, the wheels now read 99,884.45+ (Totalizer engaged—
$125.55 added to
00,115.55— negative wheels)

With the totalizer in this condition, all of the yokes 63 will be held in their moved positions, so that when the totalizer is disengaged from the actuators, none of the wheels will be moved during such disengagement of the totalizer. This is true because an amount is standing on the units wheel and the cams thereon prevent any movement of the yokes 63. Now when the totalizer is disengaged from the actuators 41 the true negative balance of $115.55 will be standing on the subtract totalizer wheels 31.

The reason for arranging the cams 61 spirally on shaft 60 is to permit the lower order wheels to be adjusted first, during the disengaging movement of the totalizer, so that they can control the next higher order, and so on, across the whole totalizer in a manner very similar to an ordinary transfer mechanism.

As before mentioned the aliner 79 will hold the totalizer wheels which are to be engaged with the actuators against movement, during the engaging movement of the totalizer. This aliner is carried by a pair of arms 81, (Fig. 2) adapted to be rocked by means of cams not shown herein, but shown in detail and described in the above mentioned Fuller patent. This mechanism is well known in the art, and therefore no further description thereof is found necessary.

The arms 81 are held against lateral movement on a shaft 83 by means of collars 82. The shaft 83 is adapted to be held against movement by brackets 84 (Fig. 2) which are secured to the shaft 60 and to the shaft 83. Thus the aliner 79 is held against movement. When the totalizer is shifted laterally, the wheels which are not to be engaged with the actuators will always be in alignment with the notches 80 of the aliner 79.

Fig. 1 shows the negative wheels 31 in alignment with the actuators 41. In this position the aliner 79 engages the negative wheels, but the notches 80 are in alignment with the positive wheels 30. However, when the totalizer is shifted toward the right (Fig. 1), the positive wheels 30 will be shifted into alignment with the actuators thereby moving the negative wheels 31 into alignment with the notches 80.

Figure 2:
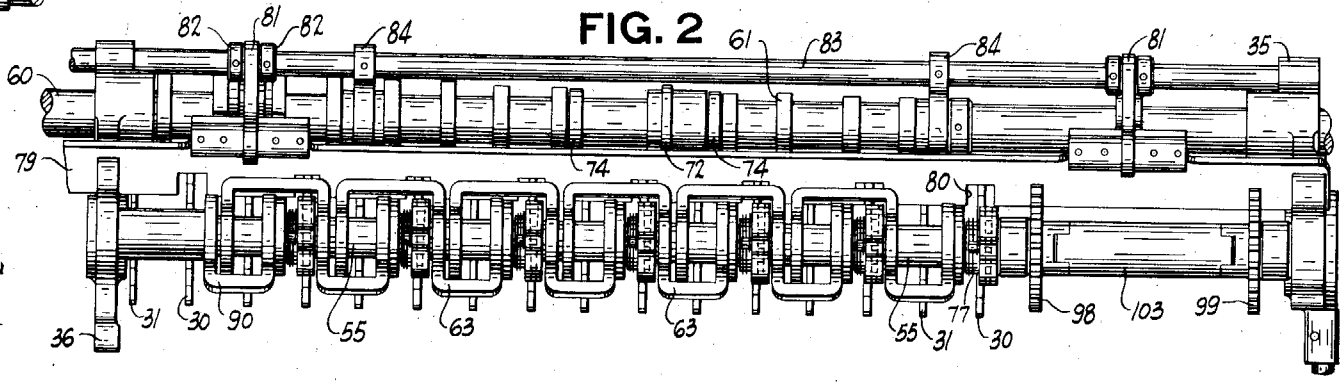
Fig. 2 is a rear view of the totalizer mechanism showing particularly the controlling yokes.

By referring to Fig. 2 it will be seen that the yoke 90 for the units bank is somewhat different from the yokes 63 for the higher order wheels. This is necessary because the units order totalizer element is provided with only one cam 68, which is secured to the positive wheel 30 for this order. This is due to the fact that the units wheels 30 and 31 are never adjusted or actuated by any other means than the differential actuators 41. Therefore the yoke 90 (Fig. 3) has an arm 66 only, which arm carries a stud 71 cooperating with the cam 68 on the units positive wheel 30. The other end of the yoke has secured thereto a single toothed arm 46, like those previously described, cooperating with the tens order positive wheel 30 through the collar thereon. When either of the units wheels is moved, the positive cam 68 will be moved, and therefore, will control the yoke 90 (Figs. 2 and 3) thereby adjusting the collar 45 for the tens bank (Fig. 3) for causing one of the wheels 30 or 31 to be moved, and when this occurs, its respective cam 68 or 67 will control the yoke 63 for the next higher bank.

*Bell ringing mechanism*

Figure 5:
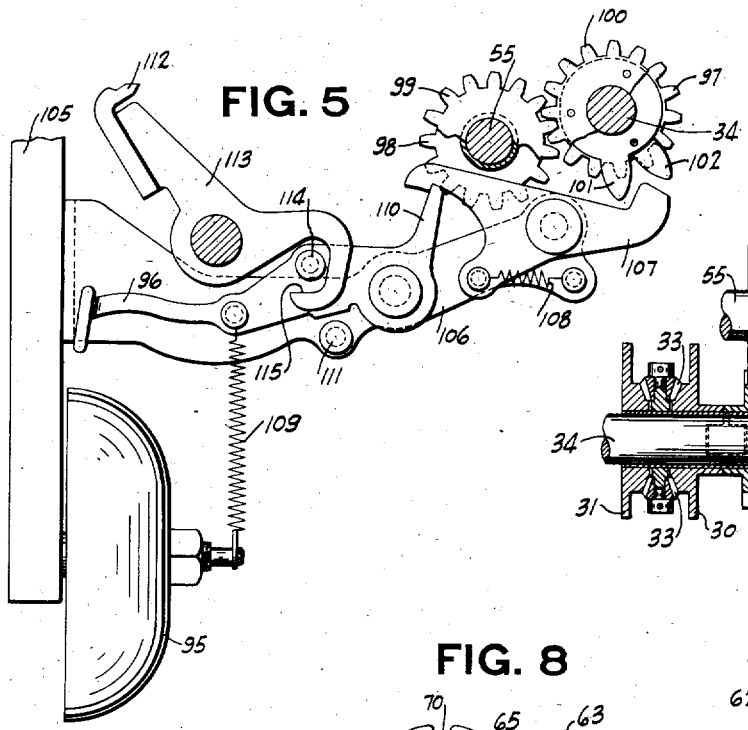
Fig. 5 is an elevation of the bell-ringing mechanism.
Figure 6:
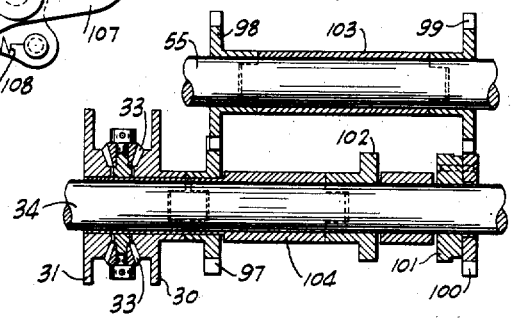
Fig. 6 is a detail view in cross-section, showing the mechanism for driving the bell-ringing mechanism.

A bell 95 (Fig. 5) is struck by a hammer 96, each time the totalizer is overdrawn, or in other words when it passes from a positive to a negative quantity, thus notifying the operator that the totalizer has been overdrawn. The bell is also rung when the totalizer passes from a negative to a positive quantity. This mechanism is under control of the highest order totalizer elements, which are shown in Fig. 6. The positive totalizer wheel 30 is clutched to a pinion 97 (see also Fig. 5) constantly in mesh with a pinion 98, connected by a sleeve 103 to a pinion 99, always in mesh with a pinion 100. Secured to the pinion 100 is a tripping tappet 101, for operating the bell hammer during those operations when the positive wheel 30 is in engagement with the actuator as said wheel passes through zero when the totalizer goes from a negative to a positive quantity. Connected by a sleeve 104 (Figs. 1 and 6) to the negative wheel 31 is a tripping tappet 102 adapted to operate the bell hammer 96 as the highest order negative wheel 31 passes through zero when the totalizer is overdrawn or goes from a positive to a negative quantity, during those operations in which the negative wheels 31 are in engagement with the actuators.

Carried by the back frame 105 (Fig. 5) of the machine is a bracket 106 upon which is pivoted a three-armed latch 107, which is spring pulled in a counter-clockwise direction by spring 108. A spring 109 is adapted to rotate the hammer 96 to strike the bell 95, but is normally prevented from doing so by the hammer finger 110 being held by the latch 107. However, when either of the tripping tappets 101 or 102 as above described, passes from zero to 9, during any operations, it will cause the latch 107 to be rotated to release the finger 110, thereby permitting the spring 109 to carry the hammer 96 against the bell 95, to signal the operator, to notify him that an overdraft has been made, or that the totalizer again registers a positive quantity as the case may be. The stud 111 carried by the frame 106 prevents the hammer 96 from being thrown too far toward the bell 95.

The hammer 96 is restored to its locked position during the beginning of the next operation of the machine, after it has been tripped. The mechanism for accomplishing this is part of the usual indicator aligning device mechanism. This aligning device 112 has not been described herein, but a detailed description may be had by referring to the above mentioned Fuller patent. It will be sufficient to say herein that the aliner 112 is rocked first counterclockwise and then in a clockwise direction. It is during the time that the aliner arm 113 is in the position shown in Fig. 5, that the hammer is tripped so that a stud 114 on the hammer will be free to move when the hammer is tripped.

After the hammer has been tripped the stud 114 will contact with the shoulder 115 on the aliner arm 113. Therefore, when the aliner is rocked in a counter-clockwise direction, the shoulder 115 will lift the hammer 96 high enough to again cause its finger 110 to be locked behind the shoulder on the latch 107.

While the forms of mechanisms herein shown and described are admirably adapted to fulfill the objects primarily stated, it is to be understood that it is not intended to confine the invention to the forms of embodiment herein disclosed, for it is susceptible of embodiment in various forms all coming within the scope of the claims which follow.

What is claimed is:

1. In an adding and subtracting totalizer, the combination of a set of positive amount elements, a set of negative amount elements, both sets being at zero when the totalizer is clear, actuators for entering amounts into the totalizer, and means, including a system of yokes, to adjust and control the elements so that when the totalizer is disengaged from the actuators with amounts thereon the sum of the amounts on the positive and negative elements is always equal to unity of an order next higher than the order of the highest totalizer element.

2. In an adding and subtracting totalizer, the combination of a set of positive amount elements, a set of negative amount elements, both sets being at zero when the totalizer is clear, actuators for entering amounts into the totalizer, and means for causing said elements to be adjusted and controlled so that when the totalizer is disengaged from the actuators with amounts thereon the sum of the amounts on the positive and negative elements is always equal to unity of an order next higher than the order of the highest totalizer element.

3. In an adding and subtracting totalizer, the combination of a set of positive amount elements, a set of negative amount elements, both sets being at zero when the totalizer is clear, actuators for entering amounts into the totalizer, and means, controlled by the lowest order element of the set upon which an amount has been entered, for controlling the higher order elements of the other set so that when the totalizer is disengaged from the actuators with amounts thereon the sum of the amounts on the positive and negative elements is always equal to unity of an order next higher than the order of the highest totalizer element.

4. In an adding and subtracting totalizer, the combination of a set of positive amount elements, a set of negative amount elements, both sets being at zero when the totalizer is clear, actuators for entering amounts into the totalizer, means for engaging the totalizer with the actuators, means for causing all elements of one of said sets of elements except the units element to move to nine during the engaging movement, and means for preventing all elements of the last named set, of higher order than the highest order of the set upon which an amount is entered, from returning to zero during the disengaging movement of the totalizer.

5. In an adding and subtracting totalizer, the combination of a set of positive amount elements, a set of negative amount elements, an adjustable device cooperating with each element of each set for controlling the adjustment of the elements of higher order of the other set, and means connected to the elements of each set to control the adjustment of said device.

6. In an adding and subtracting totalizer, the combination of a set of positive amount elements, a set of negative amount elements, a device cooperating with each element of each set for controlling the adjustment of the elements of higher order of the other set, and a camming means for moving the devices to their adjusted positions.

7. In an adding and subtracting totalizer, the combination of a set of positive amount elements, a set of negative amount elements, a member, two arms on said member for cooperating with an element of each set, means intermediate the elements of each order, a toothed arm on said member adapted to cooperate with the means of the next higher order for controlling the adjustment of the elements of next higher order, and camming means for moving said member for adjusting the higher order elements.

8. In an adding and subtracting totalizer, the combination of a set of positive amount elements, a set of negative amount elements, both sets being at zero when the totalizer is clear, actuators for entering amounts into the totalizer, means for engaging the totalizer with the actuators, an aliner for holding one set of elements against rotation during the time that the totalizer is disengaged from the actuator, a plurality of members, a toothed arm carried by each of said members adapted to cooperate with said elements, a camming means coacting with the plurality of members for rotating the set of elements which is not held against rotation by the aliner to move them to nine, as the totalizer is being engaged with the actuators, and arms on said members cooperating with the elements for controlling the adjustments of the higher order elements, when the totalizer is being disengaged from the actuators, so that when the totalizer is disengaged the sum of the positive amounts and the negative amounts will always equal unity of an order next higher than the highest order element of the totalizer.

9. In an adding and subtracting totalizer comprising pairs of positive and negative gears mounted side by side, driving pinions connecting said positive and negative gears, totalizer actuators, means for engaging either the positive or negative gears with the actuators, and means for causing the negative or positive gears not engaged to be rotated backward one step with respect to the gears engaged as the totalizer is moved to effect engagement.

10. In an adding and subtracting totalizer comprising an adding and subtracting unit involving a positive gear and a negative gear mounted in spaced relation on a supporting shaft, a sleeve rotatably mounted on said shaft between said gears, a pinion meshing with said gears, a stud on said sleeve rotatably supporting said pinion, a totalizer actuator, means for shifting either gear into position to engage said actuator, an aligning means for aligning the gear in position to engage said actuator, means for engaging the gear with the actuator, and means operated as the gear is engaged for rotating said sleeve.

11. In an adding and subtracting totalizer, the combination of a set of positive amount elements, a set of negative amount elements, a recessed member attached to each element of each set, means having projections normally entering the recesses of said members, a device to operate said means to withdraw the projections from the recesses, and a toothed arm operated by said means to adjust the elements of next higher order.

12. In an adding and subtracting totalizer, the combination of a set of positive amount elements; a set of negative amount elements, both sets being at zero when the totalizer is clear; actuators to enter amounts into the totalizer; mechanism to engage the totalizer with the actuators and disengage it therefrom; adjustable means cooperating with both sets of elements to move all elements of one set, except the units element, backwardly one step as the totalizer is being engaged with the actuators, and forwardly one step as the totalizer is being disengaged from the actuators; a device to operate said adjustable means; and means to prevent the forward movement of those elements above the highest denominational order into which an amount is entered.

13. In an adding and subtracting totalizer, the combination of a set of positive amount elements: a set of negative amount elements; actuators to enter amounts into the totalizer; mechanism to engage the totalizer with the actuators and disengage it therefrom; adjustable means cooperating with both sets of elements to move all elements of one set, except the units element and the elements of higher denominational order than that to which an amount has been added, backwardly one step as the totalizer is being engaged with the actuators, and forwardly one step as the totalizer is being disengaged from the actuators; and a device to operate said adjustable means.

14. In an adding and subtracting totalizer, the combination of a set of positive amount elements; a set of negative amount elements; actuators to enter amounts into the totalizer; mechanism to engage the totalizer with the actuators and disengage it therefrom; adjustable means cooperating with both sets of elements to move all elements of one set, except the units element, backwardly one step as the totalizer is being engaged with the actuators, and forwardly one step as the totalizer is being disengaged from the actuators; a device to operate said adjustable means; and means to prevent both the backward and forward movements of those elements above the highest denominational order into which an amount has been previously entered.

BERNIS M. SHIPLEY.